United States Patent [19]

Forker, Jr. et al.

[11] 3,773,489

[45] Nov. 20, 1973

[54] CHEMICALLY STRENGTHENED GLASS

[75] Inventors: Ray B. Forker, Jr., Beaver Dams; Theodore R. Kozlowski, Horseheads; Dennis A. Krygier, Corning; Joseph N. Panzarino, Big Flats, all of N.Y.

[73] Assignee: Corning Glass Works, Corning, N.Y.

[22] Filed: Mar. 16, 1971

[21] Appl. No.: 124,931

Related U.S. Application Data

[63] Continuation-in-part of Ser. No. 877,055, Nov. 14, 1969, abandoned.

[52] U.S. Cl. .................................... 65/30, 65/116
[51] Int. Cl. ..................... C03c 15/00, C03c 27/00
[58] Field of Search ............................... 65/30, 116

[56] References Cited
UNITED STATES PATENTS

| | | | |
|---|---|---|---|
| 3,524,737 | 8/1970 | Doyle et al. | 65/116 X |
| 3,287,200 | 11/1966 | Hess et al. | 65/30 X |
| 3,573,072 | 3/1971 | Duke et al. | 65/30 X |
| 3,477,834 | 11/1969 | Morris | 65/30 |
| 2,146,224 | 2/1939 | Phillips | 65/116 |
| 3,586,521 | 6/1971 | Duke | 65/30 X |

*Primary Examiner*—Frank W. Miga
*Attorney*—Clarence R. Patty, Jr., Clinton S. Janes, Jr. and Kees Van der Sterre

[57] ABSTRACT

This invention relates to the strengthening of soda aluminosilicate glass articles by contacting the surface thereof with an external source of potassium ions at elevated temperatures. More particularly, the instant invention is concerned with the strengthening of $Na_2O$-containing aluminosilicate glass articles wherein the $Na^+$ ions are re-placed with $K^+$ ions utilizing a bath of molten $K_2Cr_2O_7$ or a mixture $KCl-K_2Cr_2O_7$ as the source of $K^+$ ions.

4 Claims, No Drawings

CHEMICALLY STRENGTHENED GLASS

This application is a continuation-in-part of copending patent application Ser. No. 877,055, filed Nov. 14, 1969 now abandoned.

The chemical strengthening of glass articles is a relatively recent development in the field of glass technology. The initial disclosure thereof was made by Dr. S. S. Kistler in the literature article "Stresses in Glass Produced by Non-Uniform Exchange of Monovalent Ions," Journal of the American Ceramic Society, 45, No. 2, February, 1962, pages 59–68. In that publication, Dr. Kistler announced his discovery that glass articles could be enormously enhanced in strength through experiments on soda-lime-silica and alkali borosilicate glass articles by contacting them with a molten salt of a monovalent metal ion (usually an alkali metal ion) having a larger ionic diameter than that of the alkali metal ion present in the glass. This contact was undertaken at an elevated temperature below the strain point of the glass and resulted in the larger monovalent metal ions in the salt bath migrating into the glass surface and replacing the smaller alkali metal ions originally in the glass surface which diffuse out into the bath of molten salt. Inasmuch as the exhange was undertaken at temperatures below the strain point of the glass, molecular rearrangement and viscous flow thereof were inhibited so that the larger ions from the molten salt were, in effect, squeezed into sites originally occupied by the smaller alkali metal ions. This crowding in of the larger ions, then, resulted in compressive stresses being set up within a surface layer on the glass which, in turn, imparted the substantial increase in mechanical strengths.

This basic invention of Kistler has been modified and brought to commercial fruition through subsequent innovations thereon, the most pertinent, from a commercial point of view, being the effect of alumina contents in the glass compositions in securing higher mechanical strengths thereto and the maintenance of these strengths even after considerable surface abrasion. This difference in strength behavior between aluminosilicate glasses and other glasses, soda-lime-silica glasses for example, is demonstrated in British Pat. No. 966,733.

In his experimentation, Kistler employed baths of molten nitrates as sources of the larger monovalent ions, and baths of molten nitrates have been conventionally utilized in the commercial processes for ion exchange strengthening glass articles. Nitrates have been employed for this purpose because of their relative cheapness and the absence of severe attack on glass surfaces demonstrated thereby.

In general, these ion exchange reactions have been carried out at tmeperatures about 50°–100°C. below the strain point of the glass, most commonly in the range from about 450°–535°C. These temperatures have permitted the ion exchange reactions to be carried out sufficiently rapidly such that a surface compression layer of adequate depth (up to about 5 mils) to withstand reasonable service abuse will be formed within a commercially practical period of time. Nevertheless, certain product applications have required deeper surface layers of compression, e.g., glass drinking tumblers, to resist breakage resulting from "bruise checks."

A study of break sources in chemically strengthened glass articles has demonstrated two types of breaking phenomena. In the first type, the imapct is so great that the break source immediately passes through the surface compression layer and into the interior tensile stress portion causing fracture of the article. In the second type, the impact is not severe enough to cause immediate breakage of the article but there is penetration by the source into the compression layer. This source can later independently migrate deeper into the interior of the article, particularly under the influence of moisture, and, if the surface compression layer be relatively shallow, will pass therethrough into the tension zone and cause breakage. This spontaneous delayed breakage, which has occurred in glass tumblers setting at rest on a shelf, has been defined as resulting from "bruise checks." Such breakage is, of course, unwanted and is especially undesirable and dangerous in such consumer use items as drinking tumblers. This general situation also applies to larger items such as helicopter windscreens and automobile sidelites.

The most satisfactory solution found for this problem has been to develop a very deep surface compression layer in the glass article such that bruise checks will not be able to migrate therethrough into the tension zone. We have learned that surface compression depths greater than about 15 mils and, preferably, greater than 20 mils are demanded in order to insure against spontaneous delayed breakage.

Various schemes have been proposed in the prior art for securing greater depths of surface compression layers. These have commonly involved a series of consecutive ion exchange treatments or combining thermal tempering of the glass followed by an ion exchange reaction. Examples of such practices are disclosed in British Pat. Nos. 1,096,356 and 1,026,770, respectively. These ideas, while effective in producing a deeper compression layer, have not been adopted commercially because of cost and added complexity in process and apparatus therefor. Thus, a marketable product would seem to require a single in exchange reaction wth no extraneous steps.

As has been explained above, the strengthening effect resulting from the ion exchange reaction contemplates the replacement of small ions in the glass surface with larger ions from an external source at such temperatures that thermal stress in the surface layer will not offset the compressive stresses built up in the surface layer during the ion exchange. In undertaking this ion exchange reaction, several factors play significant roles. First, at any constant temperature the depth of ion diffusion into the glass varies as the square root of time Second, the rate of ion diffusion into the glass varies exponentially with temperature according to the well-known Arrhenius rate equation. Third, there is some stress release in the glass surface at elevated temperatures below the strain point of the glass. From these factors, it can be seen that the ion exchange proceeds more rapidly as the temperature of the reaction is raised but, concomitantly, as the temperature is raised, stress release will be greater in the surface such that the overall strength increase will be less. For example, the time required to develop a surface compression layer greater than about 15 mils thick in $Na_2O$-containing glasses utilizing a $K^+$ ion exhange at temperatures below about 525°C. is measured in terms of several days to several weeks. These times are not only economically unfeasible but there is sufficient stress release to significantly reduce the mechanical strength which the final product will exhibit.

We have learned that temperatures greater than 575°C. and, preferably, between about 580°–625°C. are suitable for producing glass articles having surface compression layers of at least 15 mils in depth within an economically practical period, viz., less than 24 hours and, desirably, within about 8–16 hours. Although such temperatures may closely approach the strain point of the glass, so that stress release may diminish the strength attainable in the finished product, it is nevertheless theoretically possible to achieve adequate strengthening with treatments at these elevated temperatures, provided that the temperature employed is high enough so that a deep, compressively-stressed ion-exchange layer will form in a comparatively short time.

Unfortunately, however, we have found numerous problems associated with the use of molten nitrate baths at higher temperatures. It is known that $KNO_3$ decomposes in the molten state, probably according to the following equations:

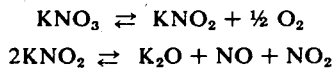

$$KNO_3 \rightleftarrows KNO_2 + \tfrac{1}{2} O_2$$

$$2KNO_2 \rightleftarrows K_2O + NO + NO_2$$

and that this decomposition proceeds at a rate directly proportional to temperature. At temperatures in excess of about 575°C. this decomposition is so rapid that the process of ion exchange strengthening is no longer commercially practicable.

More recently, it has been discovered that a deleterious effect on glass surface quality is associated with the use of molten nitrates in glass strengthening processes, and that this effect also increases with increasing temperature so as to make the use of molten nitrate baths at elevated temperatures essentially worthless for extended treatments. At high temperatures, for example above about 550°C., this deleterious effect is manifested as an etching of the glass surface, sometimes to the point where the glass appears frosted upon conclusion of the treatment. At lower temperatures, for example between about 475°–550°C., the surface quality appears satisfactory immediately after treatment, but deteriorates with time. This deterioration is manifested by the appearance of dark blotches or by uniform darkening of the strengthened glass upon exposure to certain weathering conditions for comparatively short periods. The marginal surface quality of these glasses has also been found to deleteriously affect the quality of coatings, particularly magnetic recording coatings, subsequently applied to the strengthened glass.

We have now discovered that the surface quality of strengthened glass, as manifested both by its durability and coatability, may be correlated with the concentration of extractable $K_2O$ near the surface of the glass after strengthening treatments in molten $K^+$ ion exchange baths. The quantity of extractable $K_2O$ in the glass surface is determined by leaching the surface with weak acid solutions, and then analyzing the leaching solution for $K^+$ ions. If the surface contains relatively high surface concentrations of extractable $K_2O$, the leaching process results in a darkening of the glass surface which is similar to the darkening or blotching observed upon exposure of the glass to an acidic atmospheric environment. Furthermore, the number of defects observed in magnetic films deposited on strengthened glasses is directly related to the amount of extractable $K_2O$ found in the surface of the glass after strengthening.

Accordingly, it is the principle object of the present invention to provide an improved method for strengthening of $Na_2O$-containing aluminosilicate glass articles with $K^+$ ions, wherein high temperatures may be employed to obtain a deep surface compression layer without causing unacceptable decomposition of the salt bath or etching of the glass surface, and wherein the aforementioned problems of surface durability and coatability may be avoided.

It is a further object of the present invention to provide a strengthened $Na_2$-containing aluminosilicate glass article having a surface which is essentially free of extractable $K_2O$.

Other objects of the invention will become apparent from the following detailed description thereof.

Surprisingly, we have found that the aforementioned problems of bath decomposition, surface etching, and poor surface quality may all be avoided by carrying out the strengehting process in a bath wherein the source of $K^+$ ions is molten $K_2Cr_2O_7$ or a molten mixture of $KCl$-$K_2Cr_2O_7$.

The effectiveness of this invention for high temperature treatments in producing deep compression layers is unequivocally illustrated in Table I which compares glass articles treated in a bath of molten $KNO_3$ to yield a surface compression layer of at least 15 mils in depth with similar glass articles immersed in a bath of moltne $K_2Cr_2O_7$ or $KCl$-$K_2Cr_2O_7$ to develop a surface compression layer of similar depth. The table clearly demonstrates the advantages in time accruing with higher temperature treatments and also illustrates the surprising fact that the mechanical strengths produced are greater with the $K_2Cr_2O_7$ and $K_2Cr_2O_7$-$KCl$ baths than with the $KNO_3$ baths when equivalent higher temperatures, shorter time treatments are utilized. Finally, the table witnesses to the severe surface attack resulting from the use of $KNO_3$-containing baths at the higher temperatures. The eutectic mixture, 3 moles $K_2Cr_2O_7$-1 mole $KCl$ has the advantage of a low melting point of 366°C. The equimolar mixture is also quite satisfactory and reduces the amount required of the relatively expensive $K_2Cr_2O_7$. Nevertheless, the halide mixtures seriously attack ferrous and non-ferrous metals, so ceramic containers rather than such metal containers as stainless steel must be utilized. Therefore, ease in production techniques dictate an upper limit of $KCl$ to an equimolar mixture. Pure $K_2Cr_2O_7$ behaves similarly to $KNO_3$, i.e., both act as strong oxidizers of steel surfaces. The corrosion problem therewith is not very severe.

In each example reported, a soda aluminosilicate glass cane sample 4 × ¼ inch diameter having the following composition: 62.6% $SiO_2$, 10.9% $Na_2O$, 3.7% $K_2O$, 3.8% $MgO$, 0.2% $CaO$, 17.1% $Al_2O_3$, 0.8% $TiO_2$, and 0.8% $As_2O_3$ was immersed in a bath of the respective molten salt. This glass was encompassed within British Pat. No. 966,733 cited above and reference is made thereto for other glass compositions suitable in the present invention. Thus, as is discussed in that patent, glasses containing less than 5% $Al_2O_3$ will not exhibit abraded strength, i.e., the improvement in mechanical strength imparted to such glasses is substantially lost when the surfaces thereof are subjected to even relatively mild abrasion. This loss in strength cannot be explained on the basis of depth of the compression layer since, for example, soda-lime-silica glasses in which the same depth of compression layer is developed as a soda aluminosilicate glasses will not exhibit good abraded strength whereas the soda aluminosilicate glass will Therefore, a practical or abraded strength can be secured in silicate glasses containing 5–25% $Na_2O$ and 5–25% $Al_2O_3$ and these glasses are of the type to which this invention is particularly directed.

The modulus of rupture valves were obtained in the conventional manner on glass cane samples whose surfaces had been abraded with 150 grit abrasive paper. Cane samples of this glass which had not been subjected to the ion exchange process exhibited modulus of rupture values between about 8,000–10,000 psi.

TABLE I

| Salt Bath | Temp. °C. | Time | Modulus of Rupture psi | Appearance |
|---|---|---|---|---|
| $KNO_3$ | 525 | 7 days | 43,000 | Clean |
| $KNO_3$ | 550 | 4 days | 22,000 | Very slight etch |
| $KNO_3$ | 575 | 24 hours | 31,400 | Moderate etch |
| $KNO_3$ | 600 | 16 hours | 23,500 | Severe etch |
| $K_2Cr_2O_7$ | 575 | 24 hours | 53,000 | Clean |
| $K_2Cr_2O_7$ | 600 | 16 hours | 34,000 | Clean |
| $K_2Cr_2O_7$-KCl- | 625 | 8 hours | 26,000 | Clean |
| $3K_2Cr_2O_7$-KCl | 575 | 24 hours | 66,000 | Clean |
| $3K_2Cr_2O_7$-KCl- | 625 | 8 hours | 25,000 | Clean |
| $K_2Cr_2O_7$-KCl- | 575 | 24 hours | 64,000 | Clean |
| $K_2Cr_2O_7$ | 625 | 8 hours | 23,000 | Clean |

This table clearly demonstrates the effectiveness of molten $K_2Cr_2O_7$ and KCl-$K_2Cr_2O_7$ mixtures as sources of $K^+$ ions at temperatures between about 575°–625°C. in developing deep surface compression layers (actually all greater than 17 mils) within short lengths of time and with essentially no surface etch. Baths of these compositions have shown substantially no decomposition, as evidenced by surface etch of the glass, after 4 weeks at a temperature of 600°C.

The $KNO_3$ immersion strength values of the table also illustrate the stress release which does occur upon long time exposure to elevated temperatures, even if they are below the strain point of a glass, in that instance about 620°C. A further comparision can be drawn from cane samples immersed in a $KNO_3$ bath for 24 hours at 500°C. which exhibited a modulus of rupture of about 90,000 psi but with a depth of compression layer of only about 5 mils.

As explained above, the surface quality and long term durability of glass strengthened according to the present invention is also greatly improved over the prior art strengthened glasses, due to the very low concentrations of extractable $K_2O$ in the glass surface which may be obtained using the novel process. These improvements provide advantages to the use of molten $K_2Cr_2O_7$ baths over the use of $KNO_3$ baths even when ordinary moderate temperature treatments are to be carried out. Thus, for certain applications wherein depth of compression layer is not a prime consideration, we employ treatment temperatures of at least about 475°C. and preferably between about 500°–550°C. to obtain glass of improved surface quality and durability having a surface compression layer depe enough for most ordinary applications. Recent research with molten $KNO_3$ baths has indicated that the increasing concentrations of extractable $K_2O$ observed in the surface of strengthened glass may be directly related to the pH of dissolved samples of the bath, which is found to increase as the bath ages. Although close control over the bath by monitoring the pH of such samples and counteracting the increases with bath additives can result in limited improvements in glass surface quality, such control in production processes is quite difficult. In addition, the pH levels which may be maintained in such samples even when strictly controlled, are limited, so that the extremely low extracted $K_2O$ values required for certain applications such as magnetic coating substrates may not be obtained on a production-line basis. Finally, post-strenthening techniques employed to extract surface $K_2O$ and thus to ensure good film coatability have proven to be expensive and dangerous.

Surprisingly, we have discovered that molten $K_2Cr_2O_7$ and $K_2Cr_2O_7$-KCl baths yield strengthened glasses containing essentially no extractable $K_2O$, as measured by a standardized method, when compared to glasses strengthened in $KNO_3$. $KNO_3$-strengthened glasses, on the other hand, may contain up to about 19 micrograms per square centimeter of extractable $K_2O$, and usually range between about 0.2–2.0 micrograms per square centimeter on a production-line basis.

Table II correlates data obtained from tests performed on soda aluminosilicate glass samples subjected to strengthening treatments in molten $KNO_3$ and $K_2Cr_2O_7$ salt baths. All of the samples were of a glass composition consisting essentially, in weight percent as calculated from the bath, of 61% $SiO_2$, 17% $Al_2O_3$, 13% $Na_2O$, 3.4% $K_2O$, 4% MgO, 0.8% $TiO_2$, and 0.8% $As_2O_3$.

The values for surface concentrations of extractable $K_2O$ were obtained by immersing the strengthened glasses in aqueous leachant solutions containing 10 percent by weight of HCl for 10 minutes at 25°C., and then determining the concentration of $K^+$ ions in the leachant solution using a flame photometer.

The glass darkening data refer to the appearance of the glass after leaching to extract surface $K_2O$. It has been confirmed that glass which darkens even slightly after such an immersion may show dark blotches or uniform darkening after even a few days of weathering in an environment where the atmospheric acid levels are high. Such glass may be unacceptable for use, for example, as opthalmic or automotive glass because of its poor weatherability.

Magnetic film quality was determined for films applied the unleached glass, to show the effects of surface $K_2O$ concentration thereon. The films were deposited according to well-known procedures wherein the glass was contacted with a volatilizable iron compound at elevated temperatures to form an iron oxide film which is subsequently reduced to pure magnetite. Film quality was judged to be good if less than about 10 pin holes or other film discontinuities which caused magnetic dropout, i.e., loss of magnetic properties, were found per square foot of coated glass. Quality was considered fair if the number of magnetic defects ranged between about 10–20 per square foot and poor if more than about 20 magnetic defects per square foot were found.

Both the $KNO_3$ and the $K_2Cr_2O_7$ baths were uncontrolled, i.e., they were not treated with additives to control bath quality during the period of testing, and, in the case of the $KNO_3$ bath, the absence of controlling additives caused a deterioration in bath quality with age. The effects of ion exchange treatment time on $K_2O$ surface concentrations in stregthened glasses were also studied, but were found to be insignificant by comparison with the effects of bath aging on such concentrations.

free of extractable $K_2O$ and etching due to chemical attack.

TABLE II

| Salt bath | Bath age | Treatment time (hours) | Treatment temperature (° C.) | Extracted $K_2O$ (micrograms$^2$/cm.$^2$) | Glass darkening | Magnetic film quality |
|---|---|---|---|---|---|---|
| $KNO_3$ | New | 3 | 525 | 0.1 | None | Fair. |
| $KNO_3$ | New | 15 | 525 | 0.2 | do | Do. |
| $KNO_3$ | 1 day | 3 | 525 | 0.2 | do | Do. |
| $KNO_3$ | 2 days | 3 | 525 | 0.4 | Slight | Do. |
| $KNO_3$ | 6 days | 3 | 525 | 0.7 | do | Do. |
| $KNO_3$ | 10 days | 3 | 525 | 2.5 | Moderate | Poor. |
| $KNO_3$ | 14 days | 3 | 525 | 3.6 | Heavy | Do. |
| $KNO_3$ | 6 months | 5.5 | 525 | 8.3 | Irridescent | |
| $K_2Cr_2O_7$ | 1 day | 15 | 525 | 0.0 | None | Good. |
| $K_2Cr_2O_7$ | 1 month | 3 | 600 | 0.0 | do | Do. |
| $K_2Cr_2O_7$ | 3 months | 15 | 525 | 0.0 | do | Do. |
| $K_2Cr_2O_7$ | 6 months | 15 | 525 | 0.0 | do | Do. |
| $K_2Cr_2O_7$ | do | 3 | 625 | 0.9 | do | Do. |

From the above table the advantages accruing from the use of $K_2Cr_2O_7$ baths to obtain strengthened soda aluminosilicate glass having surfaces essentially free of extractable $K_2O$ which provide good magnetic coatability and weatherability are readily apparent. Furthermore, such glass may be produced with the use of expensive additives and strict control measures to maintain bath quality during production.

We claim:

1. In the method for chemically strengthening a soda aluminosilicate glass article through the exchange of sodium ions present in a surface layer on the article with potassium ions from a bath of a molten potassium-containing salt resulting from the immersion of said glass into said bath at an elevated temperature in the range of about 475°–625°C. for period of time sufficient to develop a compressively-stressed surface layer thereon, the improvement which comprises utilizing a bath consisting essentially of molten $K_2Cr_2O_7$ to produce a strenghtened article having surfaces essentially free of extractable $K_2O$ and etching due to chemical attack.

2. In the method for chemically strengthening a soda aluminosilicate glass article through the exchange of sodium ions present in a surface layer on the article with potassium ions from a bath of a molten potassium-containing salt resulting from the immersion of said glass into said bath at an elevated temperature in the range of about 575°–625°C. for a time of less than about 24 hours, said temperature being sufficient to develop a surface compression layer of at least about 15 mils in depth within an immersion time of less than about 24 hours, the improvement which comprises utilizing a bath consisting essentially of molten $K_2Cr_2O_7$ to produce a strengthened glass article having surfaces essentially free of extractable $K_2O$ and etching due to chemical attack.

3. The method of claim 2 wherein the bath additionally contains KCl in amounts up to about 50 mole percent.

4. The method of claim 1 wherein the bath additionally contains KCl in amounts up to about 50 mole percent.

* * * * *

UNITED STATES PATENT OFFICE
CERTIFICATE OF CORRECTION

Patent No. 3,773,489      Dated November 20, 1973

Inventor(s) Ray B. Forker, Jr., Theodore R. Kozlowski, Dennis A. Krygier and Joseph N. Panzarino It is certified that error appears in the above-identified patent and that said Letters Patent are hereby corrected as shown below:

Column 2, line 50, after "time" insert a period.

Column 3, line 38, change "glassappears" to -- glass appears --.

Column 4, line 11, change "$Na_2$-containing" to -- $Na_2O$-containing --.

Column 4, line 19, change "strengehting" to -- strengthening --.

Column 4, line 27, change "moltne" to -- molten --.

Column 5, line 1, change "a" to -- in --.

Column 5, line 61, change "depe" to -- deep --.

Column 6, line 10, change "strenthening" to -- strengthening --.

Column 6, line 19, change "19" to -- 10 --.

Column 6, line 67, change "stregthened" to -- strengthened --.

Columns 7 and 8, Table II, last line, change "0.9" to -- 0.0 --.

Column 7, line 17, change "$K_2Cr_{27}$" to -- $K_2Cr_2O_7$ --.

Signed and sealed this 14th day of May 1974.

(SEAL)
Attest:

EDWARD M. FLETCHER, JR.
Attesting Officer

C. MARSHALL DANN
Commissioner of Patents